United States Patent [19]

Parkinson et al.

[11] 4,032,604

[45] * June 28, 1977

[54] HOT WATER SUPPLY AND DISTRIBUTION STRUCTURE FOR COOLING TOWERS

[75] Inventors: Graham Charles Parkinson, London, England; Homer E. Fordyce, Kansas City, Mo.

[73] Assignee: The Marley Cooling Tower Company, Mission, Kans.

[ * ] Notice: The portion of the term of this patent subsequent to Apr. 29, 1992, has been disclaimed.

[22] Filed: Apr. 17, 1975

[21] Appl. No.: 568,891

Related U.S. Application Data

[63] Continuation-in-part of Ser. No. 286,341, Sept. 5, 1972, Pat. No. 3,880,964.

[52] U.S. Cl. .................. 261/111; 261/DIG. 11
[51] Int. Cl.² ........................................ B01F 3/04
[58] Field of Search ............... 261/66, 67, 71, 91, 261/110, 111, 113, 97, DIG. 11, DIG. 77

[56] References Cited

UNITED STATES PATENTS

| | | | |
|---|---|---|---|
| 2,512,271 | 6/1950 | Green | 261/111 |
| 2,965,548 | 12/1960 | Hachmuth | 261/114 R |
| 3,243,166 | 3/1966 | Osenga et al. | 261/DIG. 11 |
| 3,322,409 | 5/1967 | Reed | 261/111 X |
| 3,395,900 | 8/1968 | Meek | 261/67 X |
| 3,606,984 | 9/1971 | Robertson | 261/91 X |
| 3,608,873 | 9/1971 | Furlong | 261/111 X |
| 3,782,451 | 1/1974 | Cates | 261/DIG. 11 |
| 3,834,681 | 9/1974 | Fordyce et al. | 261/111 |
| 3,846,519 | 11/1974 | Spangemacher | 261/DIG. 11 |
| 3,880,964 | 4/1975 | Fordyce et al. | 261/111 |

*Primary Examiner*—Tim R. Miles
*Assistant Examiner*—Richard L. Chiesa
*Attorney, Agent, or Firm*—Schmidt, Johnson, Hovey & Williams

[57] ABSTRACT

Hot liquid supply and distribution structure for use with crossflow cooling towers is disclosed which permits selective variation of the amount of liquid delivered to respective fill sections of the tower in order to optimize liquid cooling therein under varying ambient weather conditions while also minimizing the amount of piping and manually operated controls needed for precise flow and distribution control. Primary supply means preferably in the form of an elongated flume or conduit is situated inwardly of and adjacent to an inner distribution basin with a plurality of outwardly extending secondary flumes or conduits interconnecting the primary supply means and an outer distribution basin. Overflow structure is also provided in the primary supply means for permitting gravitation of hot liquid therefrom to the inner basin when the liquid level in the primary supply means reaches a predetermined height; the outwardly extending flumes or conduits are connected to the primary supply means below the overflow level thereof so that liquid continuously flows towards the outer basin during all tower operations. In preferred forms, selectively actuatable gate-type flow control structure is positioned within the secondary flumes or conduits for variably restricting fluid flow therethrough as desired.

9 Claims, 16 Drawing Figures

HOT WATER SUPPLY AND DISTRIBUTION STRUCTURE FOR COOLING TOWERS

This application is a continuation-in-part of identically titled application Ser. No. 286,341, filed Sept. 5, 1972 and now U.S. Pat. No. 3,880,964.

This invention relates to liquid cooling towers and relates more specifically to improved hot liquid supply means therefor.

Liquid cooling towers generally include a hot liquid distributor in the form of a distribution basin that overlies a fill assembly through which the liquid gravitates in intimate, evaporative heat exchange relationship with a cooling airflow passing through the fill assembly. The cooled liquid is collected in an underlying basin and returned to be utilized in, for instance, a power plant from where the liquid is pumped back to be recycled through the cooling tower. Cooling towers of the class described may employ natural draft techniques for creating a crossflow movement of cooling air through the fill assembly such as by utilization of a hyperbolic stack wherein the fill assembly is placed circumferentially around the lower portion of the stack. Also an induced draft of cooling air may be created by incorporating fans for drawing airflow through the fill assembly.

It is desirable in many instances that the water loading on different portions of the fill assembly of a given crossflow tower be selectively varied in response to differing ambient temperatures and other climatic factors to assure optimum tower performance. For instance, it is often desirable to increase the water loading at the outer section of the fill assembly adjacent the air inlet thereto during below freezing operation to preclude icing of the air inlet louvers which would otherwise greatly restrict airflow through the fill assembly. However, it is also desirable from an operational standpoint to ensure that water to be cooled is delivered to the proper fill section throughout the entire extent thereof in order to equalize the heat load imposed on the tower. This of course can present problems in situations where large quantities of water need to be cooled, as in the case of very large capacity towers.

One successful answer to this problem is disclosed in co-owned U.S. Pat. No. 3,322,409, wherein the overhead distribution basin includes a pair of separate sections overlying inner and outer portions of the fill assembly. Piping structure delivers liquid along separate paths to these two sections of the distribution basin, and control valve means interposed in the supply pipes allow selective variation of flow to respective sections of the basin. Although operationally successful, this arrangement still necessarily includes a considerable amount of expensive supply piping which in many instances of tower operation is not used to the fullest. For example, the piping which carries liquid to the outer section of the distribution basin usually carries a less than full water load except on occasions when substantially the entire liquid flow is diverted therethrough to the outer section to deice the air inlet louvers of the fill assembly. Also, such piping can freeze-up during low water loading under extremely low temperature. An associated problem is the tendency of the actuating mechanism of the valve which controls flow to the outer section of the distribution basin, to collect ice and freeze solid. Necessarily this actuating mechanism is disposed above the distribution basin in a location exposed to an atmosphere of cold, fine water spray tending to ice the mechanism. When frozen solid of course, malfunction occurs with consequent loss of control of the liquid flow to the outer distribution basin which may ultimately require shutdown of at least certain portions of the cooling tower during cold weather for deicing.

Preferably, any supply piping utilized in cooling towers should be formed of noncombustible, noncorrosive material such as precast concrete. While it has been known to construct such piping of suitable wood material such as redwood, it has been found that wooden components are undesirable, particularly where very large cooling towers are involved, because the use of wood presents a fire hazard as well as being expensive and presenting continual maintenance problems. Furthermore, the relatively massive nature of such piping presents serious problems of installation.

It is therefore the primary object of the invention to provide a crossflow cooling tower having hot liquid supply structure which allows variable hot liquid delivery to respective fill portions of the tower in flow patterns assuring the most efficient cooling operation thereof notwithstanding fabrication of the supply structure from precast noncombustible components and with only a minimum of expensive piping and header structure therefor.

A corollary aim of the invention is to provide a tower having hot liquid distribution structure including an inner and outer distribution basin respectively overlying corresponding fill sections, in conjunction with supply structure for the separate basins which ensures even, metered delivery of initially hot volumes of liquid to the outer basin while also permitting the inner basin to be directly supplied in heavy heat load situations or when the volume of water to be handled is excessive, in order to most efficiently cool the hot liquid delivered to the tower.

A further aim of the invention is to provide hot liquid supply structure including interconnected first and second supply means which serve to uniformly deliver volumes of hot liquid to the outer basin with the inner basin being selectively supplied when the liquid level within the first or primary supply means reaches a level to overflow therefrom into the adjacent inner basin; the second supply means preferably communicates with the first supply means at a level below the overflow level thereof in order to ensure the coordinated supply of hot liquid to the respective basins.

Yet another object of the invention is to provide hot liquid supply structure of the type described wherein any combination of open-top flumes or tubular conduits can be employed to provide the necessary first and second liquid supply means, and wherein selectively operable gate-type means are interposed in the secondary supply means for variably controlling water flow therethrough to provide more flexible liquid cooling properties for the tower.

Figure 1:
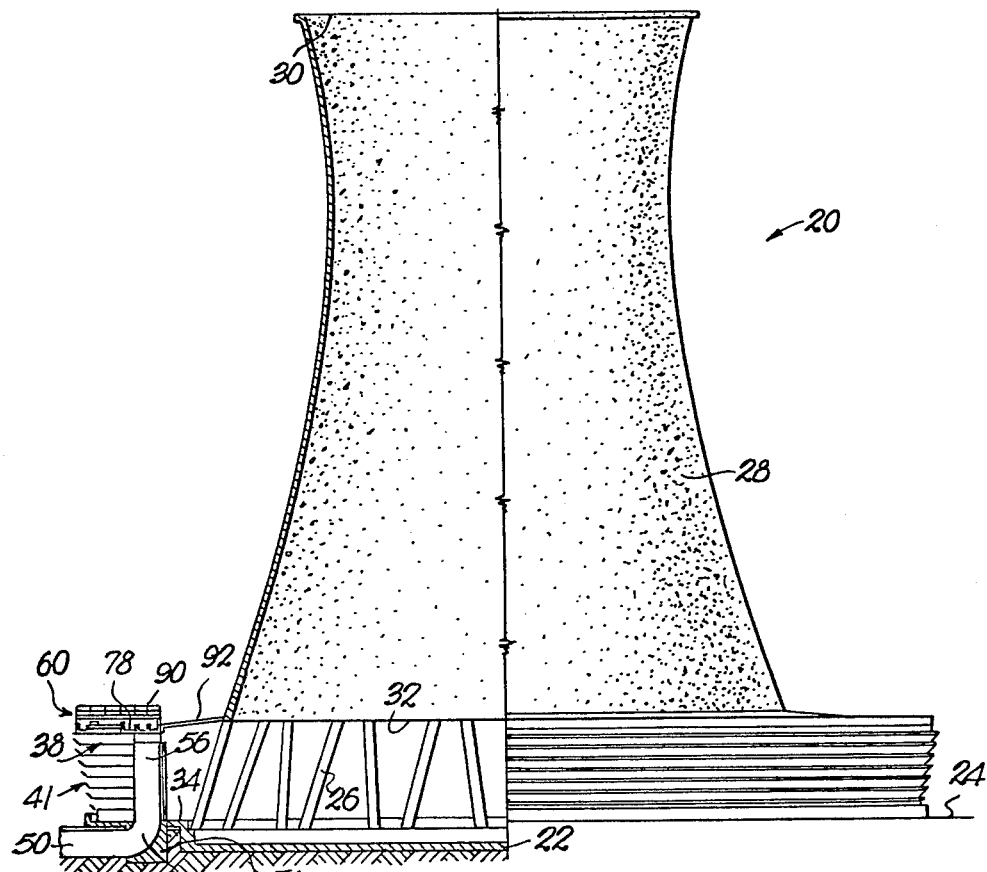
FIG. 1 is an elevational view of a natural draft cooling tower embodying the present invention with the left half of the tower being in cross section to reveal internal construction.

Referring now to FIGS. 1–7, a crossflow type natural draft water cooling tower is broadly designated by the numeral 20 and includes a circular shell foundation 22 located below ground level 24. A series of inclined support columns 26 carry an upright, hyperbolic reinforced concrete shell 28 in supporting relationship upon the foundation. The shell has an air outlet 30 at its upper end and a lower circular margin 32 spaced from ground level to define an air inlet around the entire circumference of the shell. The configuration of shell 28 creates a natural draft of airflow horizontally through this air inlet, and defines an exhaust path for exhausting this airflow generally vertically out of air outlet 30.

An annular, concrete, cold water collection basin 34 surrounds shell 28 and serves to support framework, broadly referred to as 36, which carries a series of crossflow fill assemblies 38 in overlying relationship to collection basin 34. The fill assembly may comprise, for instance, a plurality of noncombustible, horizontal splash bars 40 of corrugated configuration carried by vertical, noncombustible support grids 42. A series of relatively wide, horizontal air inlet louvers 44 are provided at the outer peripheral margin 41 of fill assembly 38. Ambient air currents are drawn generally horizontally through the louvers 44 and fill assembly 38 in crossflow relationship to water gravitating vertically downwardly through the latter. The louvers 44 are inclined in the direction of airflow through the fill assembly and are positioned in vertically staggered relationship with the lowermost margin of each louver located above an area of the louver there next below intermediate the longitudinal margins of the latter. A suitable ring of conventional drift eliminators 48 is located at the inner side of the fill assembly 38 to promote removal of carryover or drift of liquid in the airflow prior to being discharged vertically out of shell 28. A curb wall 46 at the outer peripheral margin of collection basin 34 facilitates collection of liquid therein for subsequent exhaust through return piping (not shown).

Figure 2:
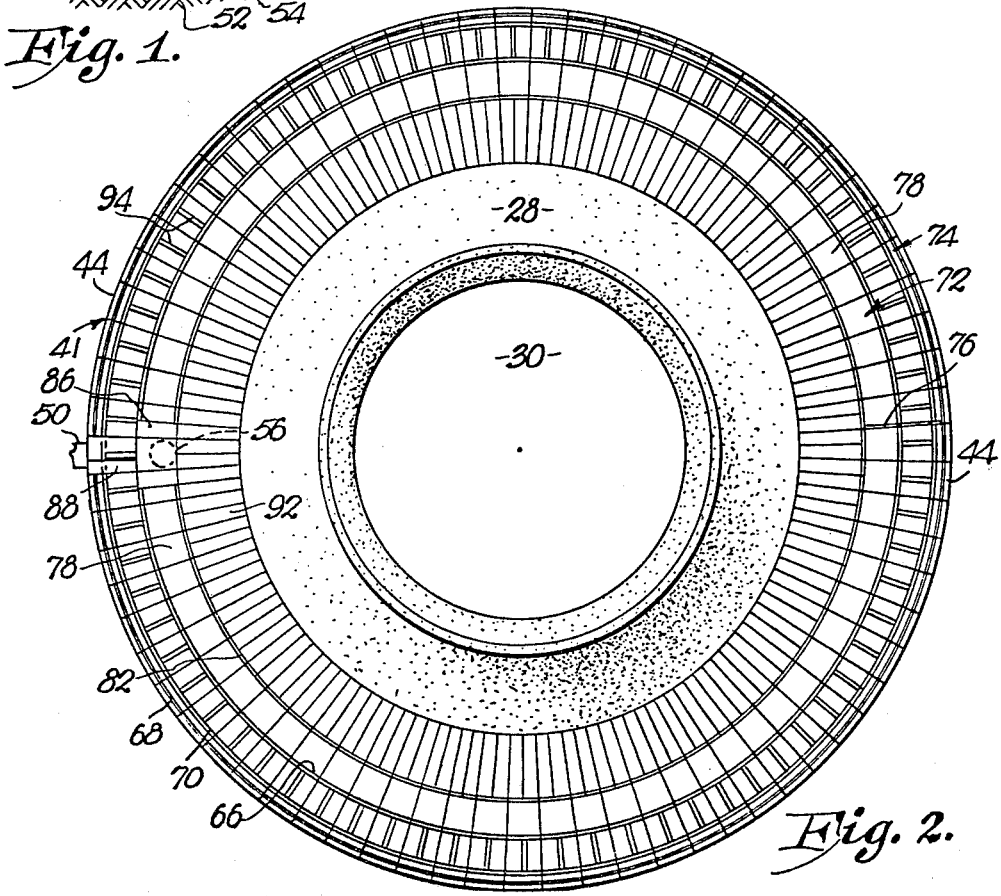
FIG. 2 is a top plan view of the tower illustrated in FIG. 1.
Figure 3:
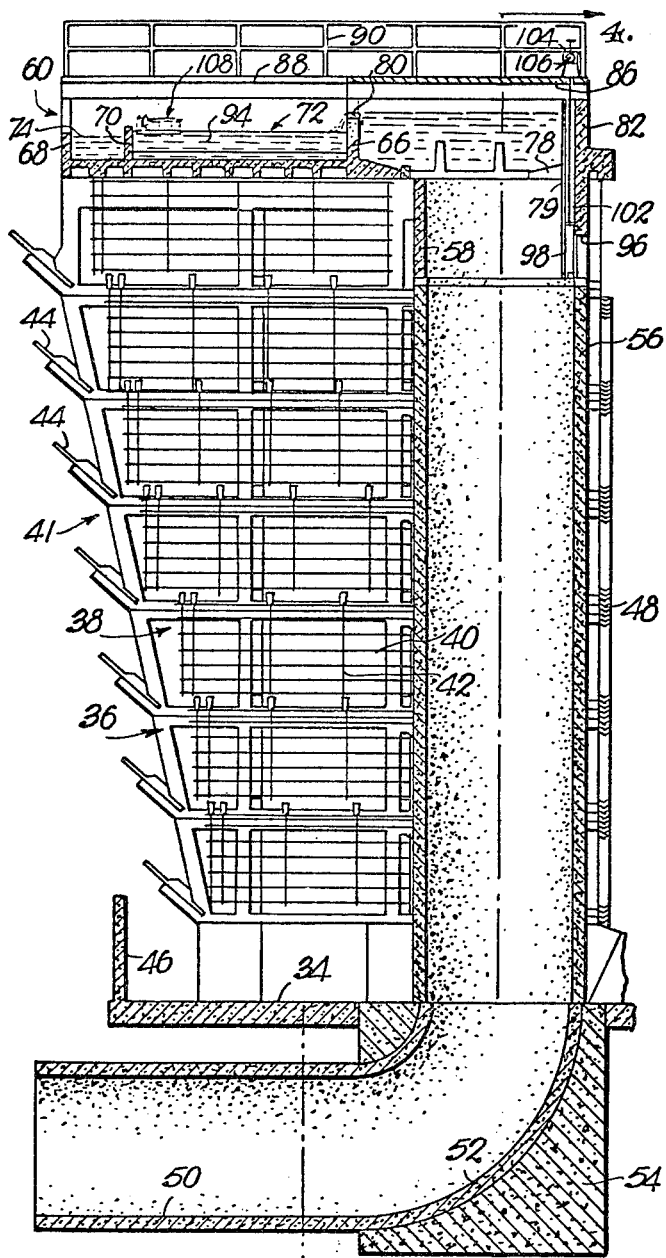
FIG. 3 is a fragmentary cross-sectional view of the fill assembly portion of the tower and showing the liquid supply means therefor.
Figure 4:
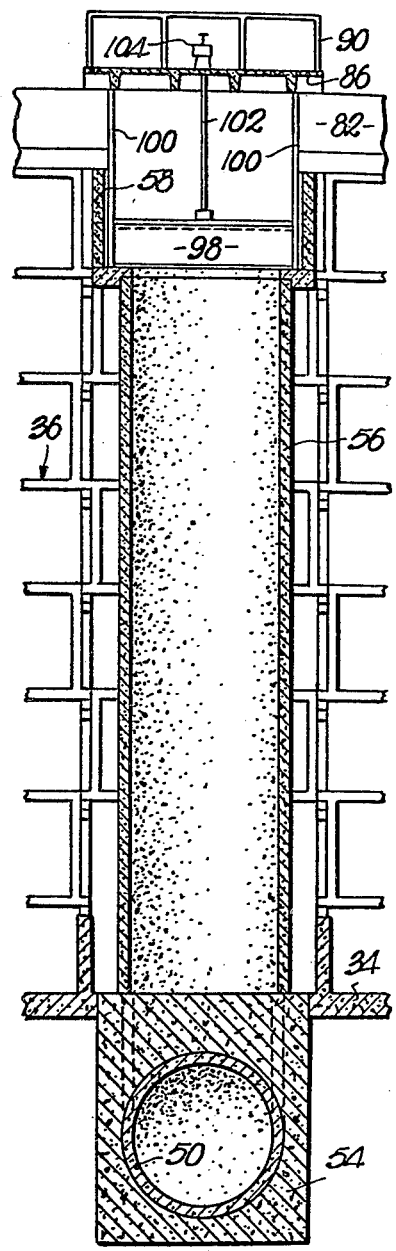
FIG. 4 is a cross section as viewed along line 4—4 of FIG. 3.

A hot liquid distributor generally designated by the numeral 60 overlies fill assembly 38 and comprises a plurality of precast, radial segments which are of a size facilitating lifting thereof by construction equipment for emplacement above the fill assembly in an annular ring around the circumference thereof. Each of these distributor components includes a plurality of floor panels 62 having orifices 64 therein adapted to receive metering nozzles which distribute liquid uniformly across the fill assembly. Distributor 60 has an inner wall 66 of greater height than its outer wall 68, and a third wall 70 of a height intermediate that of the inner and outer walls. Wall 70 divides the distributor into inner and outer liquid collecting and distribution basins 72 and 74 which respectively overlie inner and outer portions of fill assembly 38. In this regard, the outer portion of the fill assembly is located closer to the outer peripheral margin 41 thereof than the adjacent inner portion. Outer wall 68 of distributor 60 is located adjacent outer peripheral margin 41 so that liquid overflowing wall 68 will cascade down air inlet louvers 44. Each of the basins 72 and 74 extend circumferentially around the fill assembly, and a vertical partition 76 is included at a location diametrically opposite riser 56, as best illustrated in FIG. 2.

The liquid supply means generally includes a horizontal, buried inlet pipe 50 having a right-angle elbow section 52 at one end thereof which opens upwardly at a location inside the outer peripheral margins of the collection basin 34 and fill assembly 38. A concrete block 54 cast around elbow 52 absorbs any inclined thrusts exerted upon the elbow by liquid flowing therethrough. A large diameter, precast concrete riser 56 (shown as being octagonal although it may be of any cross-sectional shape) rests atop elbow 52 and extends vertically upwardly toward the upper proximity of the fill assembly. An open top, liquid collection box 58 is positioned in stacked relationship upon riser 56 to communicate with the upper discharge end thereof. Box 58 is also preferably precast out of concrete material and is of a size having a substantially greater transverse, cross-sectional area than the transverse, cross-sectional area of the circular interior of riser 56.

In the embodiment of FIGS. 1–7, a trough-like open-top flume 78 is situated directly above collection box 58. Flume 78 has an inlet port 79 in a bottom panel thereof providing liquid communication between the collection box and the flume. Flume 78 is located inboard of distributor 60 in relation to the flow of air therethrough, and is comprised of a plurality of precast concrete components disposed adjacent respective segments of the distributor to extend circumferentially around the fill assembly. The distributor inner wall 66 presents a common sidewall between flume 78 and the distributor 60. Preferably, wall 66 is provided with a plurality of depressions 80, at least one for each respective component of the distributor, so that liquid is delivered to the distributor along the entire length thereof simply by collecting in the flume to a level overflowing depressions 80. Uniform flow into all segments of the distributor is readily accomplished by locating depressions 80 at a uniform height. Inboard flume wall 82 is, of course, higher than depressions 80 to facilitate the collection of liquid in the flume to the overflow level to assure delivery therefrom throughout the length of the flume and distributor. If desired, vertically adjustable panels or weirs 84 at each depression 80 may be included so as to vary the effective height thereof.

Figure 7:
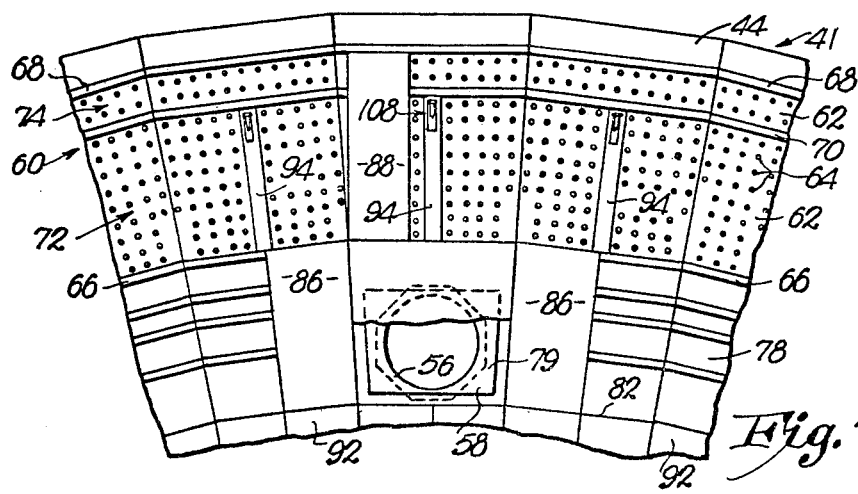
FIG. 7 is a partial top plan view of the arrangement shown in FIG. 3 with portions broken away to reveal details of construction.

A cover 86, as best seen in FIG. 7, may be included above the portions of flume 78 proximal to collection box 58 and riser 56. The cover may be coplanar with and define a portion of a horizontal access walkway 88 that has a side handrail 90. A canopy 92 in the form of a series of precast concrete panels extends between the lower marginal edge of shell 28 and flume inner wall 82 to close the space therebetween and assure passage of air in crossflow relationship horizontally through the fill assembly into the lower portion of the shell.

Collection box 58 has a relatively wide, rectangular bypass opening 96 in the inboard vertical wall thereof facing away from the fill assembly. A rectangular plate-like gate 98 blocks opening 96 in its closed position illustrated to prevent bypass flow through opening 96. Gate 98 has rollers at its opposite marginal edges which are shiftably received within vertical channels 100 secured to the inside of collection box 58, channels 100 acting as guides for gate 98 as it shifts vertically to allow flow through opening 96. A vertical screw shaft 102 is rotatably secured to gate 98 and extends upwardly therefrom to above walkway 88 wherein drive means 104 is secured to the upper end of the screw shaft 102. In the form illustrated, gate 98 is manually operated by rotation of a control handle 106 to actuate the drive means in raising and lowering the screw shaft and gate. In practice, gate 98 can be selectively shifted to present a bypass for the hot liquid entering flume 78 without substantial cooling thereof, as could be required when precise water temperature control needs to be maintained. Furthermore, the elevated position of gate 56 ensures that proper head pressure is maintained even during bypass operation to preclude cavitation conditions at the pumping means (not shown).

A series of secondary conduits 94 extend across respective segments of the inner distribution basin 72 and through walls 66 and 70 to deliver hot liquid from flume 78 to the outer distribution basin 74. The conduits 94 are disposed at an elevation below depressions 80 and submerged within liquid collected in the inner distribution basin 72.

Figure 8:
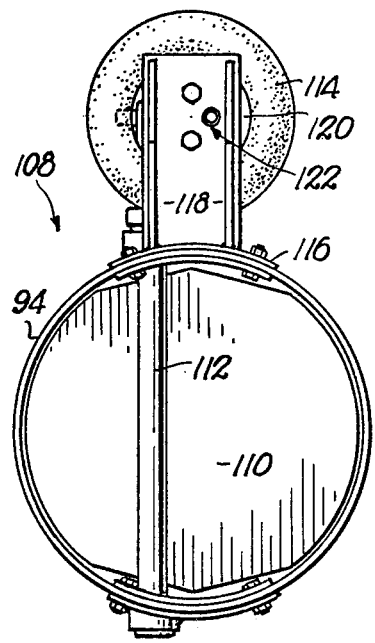
FIG. 8 is a front elevational view of the valve controlling flow to the outer distribution basin.
Figure 9:
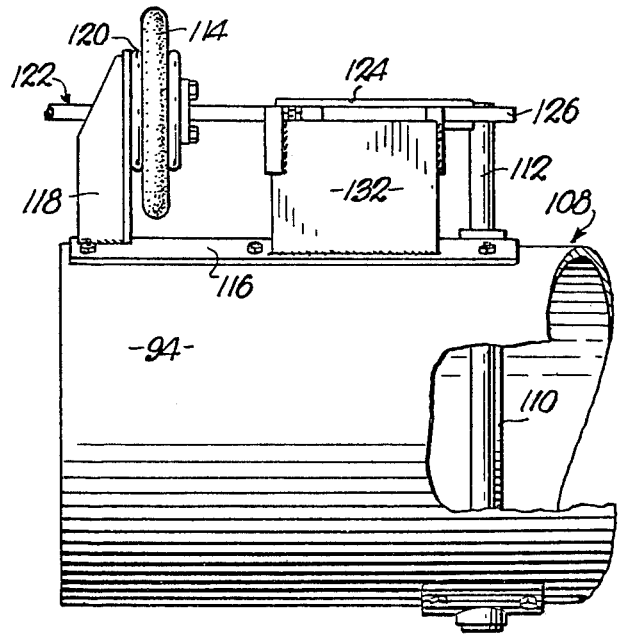
FIG. 9 is a side elevational view of the valve shown in FIG. 8 with portions broken away for clarity.
Figure 10:
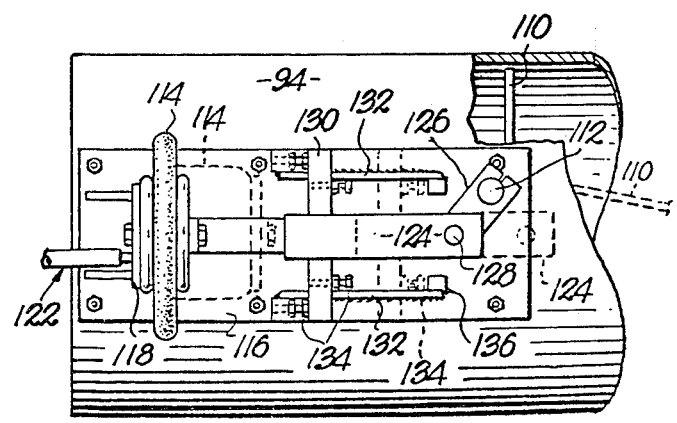
FIG. 10 is a top elevational view of the valve shown in FIG. 8.

Valve means generally designated by the numeral 108 variably restricts the flow through conduit 94 to outer basin 74. As best seen in FIGS. 8-10, the valve means includes a plate 110 substantially traversing the interior of conduit 94 in a position allowing minimum flow therethrough. Plate 110 is secured for rotation with a transversely extending shaft 112 that is rotatably carried upon conduit 94 offset to one side of the center thereof. An actuator in the form of a pneumatically expansible, annular bladder 114 formed of resilient material is mounted atop conduit 94 by a support which includes horizontally and vertically arranged plates 116 and 118. Bladder 114 is secured through a metal ring 120 to vertical plate 118 with a pressurized inlet port and conduit 122 in plate 118 communicating with the interior of bladder 114. The opposite side of bladder 114 is connected to linkage in the form of a longitudinal bar 124 and pivotal link 126 to an upper end of shaft 112 lying outside conduit 94. Link 126 is rigidly attached to shaft 112 and pivotally secured to bar 124 at point 128 so that longitudinal expansion and contraction of bladder 114 effects rotation of shaft 112 and plate 110 between the minimum flow position illustrated, and a position affording maximum flow through the conduit 94 wherein plate 110 extends generally parallel to the longitudinal axis of the conduit as shown by phantom lines in FIG. 10. A crossbar 130 secured to bar 124 is guided upon a pair of spaced, vertical plates 132. Adjustable stop nuts 134 carried by the vertical plates 132 and crossbar 130 are respectively engageable with the crossbar and stop lugs 136 on the vertical plates for limiting the linear, longitudinal stroke of bladder 114. Nuts 134 are adjustable to vary the length of stroke of the bladder.

In operation of the tower illustrated in FIGS. 1-7, hot liquid is forced by high volume pumping means through the underground inlet pipe 50 and elbow 52 to flow vertically upwardly in riser 56 into collection box 58. The larger transverse, cross-sectional area of box 58 in relation to the riser causes liquid to disperse in the box prior to flow into the flume so that the collection box 58 acts as a stilling chamber, causing substantial reduction in the vertical velocity of liquid delivered from riser 56. The height of box 58 assures that the vertical velocity of the liquid is reduced to an extent such that the liquid, upon consequently flowing into flume 78, spreads horizontally throughout inlet flume 78 without creating a "boil" of liquid in the flume at inlet 79 of greater height than the normal level of liquid collected in the flume. Without inclusion of collection box 58 to reduce the vertical velocity of the liquid, such liquid would boil upwardly to a higher than normal level in the portion of the flume proximal to its inlet port 79, to create an attendant excess flow into the adjacent portions of the distributor at the expense of reduced flow into the remote portions of the distributor. This nonuniform flow would accordingly reduce the efficiency of the tower in cooling the liquid.

The hot liquid distributes and collects along the entire length of flume 78 to the level overflowing the several depressions 80 in wall 66 to distribute uniformly throughout the entire peripheral length of inner distribution basin 72. As necessary, the panels 84 may be variably adjusted in height to assure uniform liquid distribution into basin 72. The hot liquid flows through orifices 64 in the floor panels of the inner basin 72 to be distributed uniformly for gravitation through the underlying fill assembly 38. Normally, valve means 108 is in its minimal flow position allowing a certain preselected volume of flow into outer basin 74. Liquid subsequently gravitates uniformly through all portions of the fill assembly in intimate, evaporative heat exhange relationship with the path of cooler air passing in horizontal crossflow relationship to the liquid flow. The cooled liquid is collected in underlying basin 34 and returned to be recycled through the power plant being serviced by the cooling tower.

Preferably, collection box 58 is sized to cause the necessary reduction in liquid vertical velocity at normal liquid inlet flow rates. Upon occasions when larger than normal flow rates are being handled by the cooling tower, cover 86 is effective in assisting in reducing the vertical velocity of the liquid. In particular, the liquid entering the flume through inlet port 79 will impinge upon the lower face of cover 86 so that the latter acts as a baffle assisting in tending to spread the liquid uniformly horizontally throughout the flume. Preferably, therefore, cover 86 overlies the entire collection box 58 and portions of flume 78 proximal thereto, and is disposed with its lower surface located slightly above depressions 80.

Figure 11:
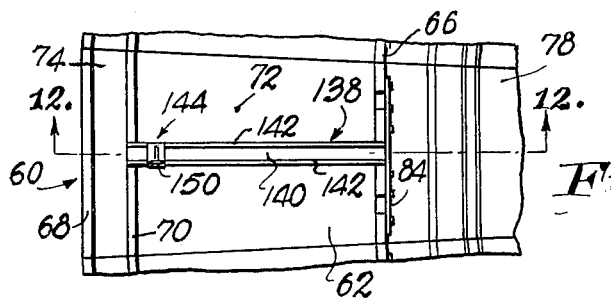
FIG. 11 is a fragmentary top plan view depicting the use of a circumferential open-top primary flume in conjunction with spaced, radially extending secondary conduits in the supply structure of the present invention.
Figure 12:
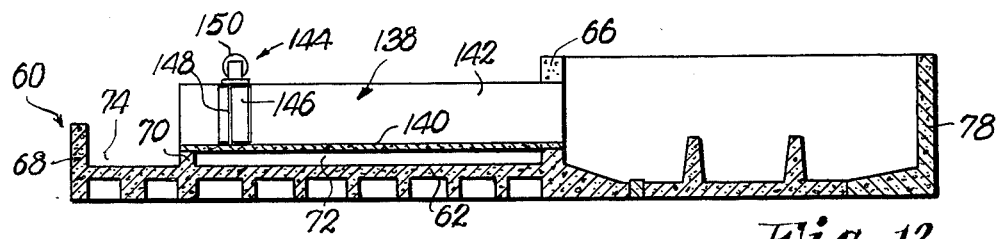
FIG. 12 is a sectional view taken along line 12—12 of FIG. 11.

Although the above described embodiment of the present invention pertains to the use of an annular open-top flume 78 in conjunction with generally radially extending, interconnected tubular conduits 94, it is to be understood that the invention is not so limited. For example, and referring specifically to FIGS. 11–12, it will be seen that an identical, annular flume 78 can be used in conjunction with a series of spaced generally radially and outwardly extending open-top secondary flumes 138. In this respect, each flume 138 is defined by a bottom wall 140 and spaced upright sidewalls 142. In addition, each flume 138 extends through spaced walls 66 and 70 at the respective opposed open ends thereof to communicate the interior of flume 78 and outer annular distribution basin 74. As in the case of the embodiment of FIGS. 1–7, sidewall 66 is common to both inner basin 72 and flume 78, and wall 66 is provided with a series of depressions along the length thereof for assuring even water supply to the inner basin 72. In like manner each depression is also provided with a vertically shiftable plate or weir 84 as illustrated in FIG. 11.

A separate valve means 144 is situated within each radially extending flume 138 adjacent the outermost end thereof as depicted. In general, each valve means 144 is identical with valve means 108 described in detail hereinabove and is operable to variably restrict liquid flow through the respective flumes 138 as desired. Each valve means 144 includes a plate 146 (FIG. 12) substantially traversing the interior of the corresponding flume 138 and is secured for rotation on an upright shaft 148 which is situated to one side of the geometric center of the flume. An actuator in the form of a pneumatically expansible, annular bladder 150 formed of resilient material is mounted atop the valve assembly for operation of the latter. In practice, the respective valves 144 operate in a manner identical to that described in connection with valves 108, and therefore a description of this operation will not be repeated. However, it is to be understood that each plate 146 is infinitely adjustable between a flow-blocking disposition substantially shutting the associated flume to a full open position wherein the plate is substantially parallel with the adjacent sidewalls of the flume.

Figure 13:
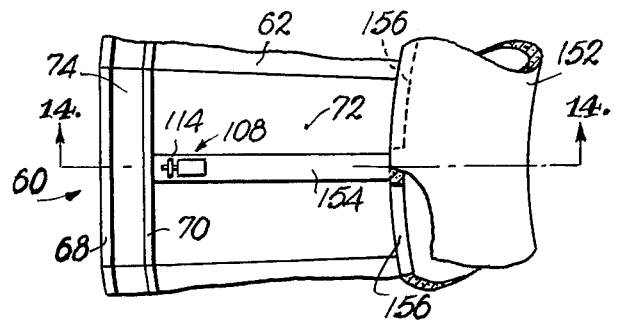
FIG. 13 is a fragmentary top plan view depicting the use of a circumferential primary conduit in conjunction with spaced, radially extending secondary conduits in the supply structure hereof.
Figure 14:
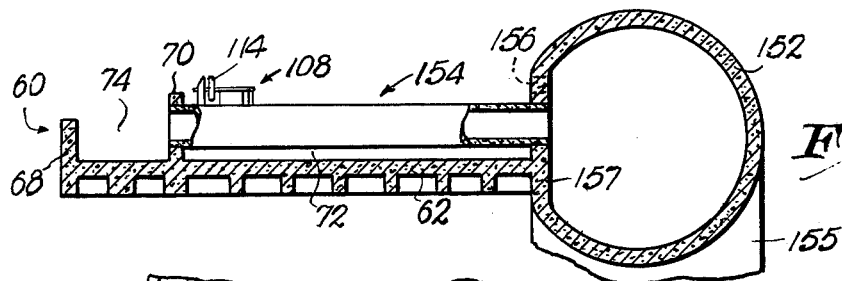
FIG. 14 is a sectional view taken along line 14—14 of FIG. 13.

It is also possible to construct the hot water supply apparatus of the present invention by using an essentially annular, closed-top primary conduit along with radially and outwardly extending flumes or conduits for supplying the outermost distribution basin. Referring specifically to FIGS. 13 and 14, it will be seen that a hollow annular primary conduit 152 is provided along with a series of spaced, generally radially extending secondary conduits 154. The conduits 154 extend through the flattened outer wall portion 157 of the conduit 152 (which also serves as the inner sidewall of basin 72) and wall 70 to communicate the interior of primary conduit 152 and outer distribution basin 74. Primary conduit 152 is supplied with hot liquid via riser 155 as will be apparent from a study of the Figures. Furthermore, a series of elongated overflow openings 156 are provided in the outermost wall section of primary conduit 152 adjacent inner basin 72 and between the spaced secondary conduits 154. The latter are in communication with the interior of primary conduit 152 below the level of the openings 156, which is important for purposes to be made clear hereinafter. Finally, each secondary conduit 154 is provided with a valve means 108 which is identical in every respect to the like numbered valve means discussed above.

Figure 15:
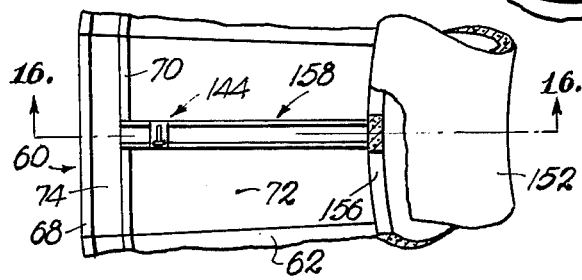
FIG. 15 is a fragmentary top plan view illustrating the use of a circumferential primary conduit in conjunction with spaced, radially extending open-top secondary flumes in the supply structure hereof.
Figure 16:
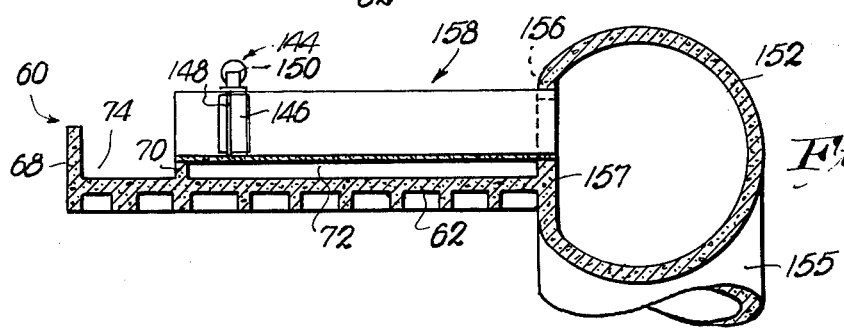
FIG. 16 is a sectional view taken along line 16—16 of FIG. 15.

The final embodiment depicted in the drawings is illustrated in FIGS. 15 and 16. In this case the annular primary conduit 152 is provided along with a plurality of spaced, generally radially extending secondary flumes 158. These likewise communicate with the interior of primary conduit 152 below the level of the overflow opening 156 in the latter. Each flume 158 is of conventional construction and is provided with valve means 144 as in the case of the embodiment illustrated in FIGS. 11–12.

The operation of the three embodiments depicted in FIGS. 11–16 is essentially the same as that described above in connection with the embodiment of FIGS. 1–7. For example, the operation of the embodiment of FIGS. 11–12 utilizing a primary annular flume with radially extending secondary flume is identical in all respects with that of FIGS. 1–7, save for the fact that liquid travels through radial flumes toward the outer basin as opposed to tubular conduits. Furthermore, and referring to the embodiments utilizing the annular primary conduit 152, it will be appreciated that water delivered to the same through riser 155 first evenly spreads throughout the entire extent thereafter and thereafter enters the respective radially extending conduits 154 or flumes 158 for delivery thereof to the outer basin 74. In this mode of operation the valves 108 or 144 may be selectively opened as desired in order to achieve precise cooling of the initially hot liquid and to spread the cooling load imposed on the tower. However, during high heat load conditions or the like when it is necessary to cool large volumes of hot liquid, the liquid level within the primary conduit 152 may rise to the level of the respective spaced overflow openings 156 therein. At this point the rising water overflows into the inner distribution basin 62 for ultimate delivery to the underlying fill components of the tower. In other cases, the valves 108 or 144 can be used to selectively control the flow of hot liquid to the outer distribution basin for a variety of operational purposes.

Figure 5:
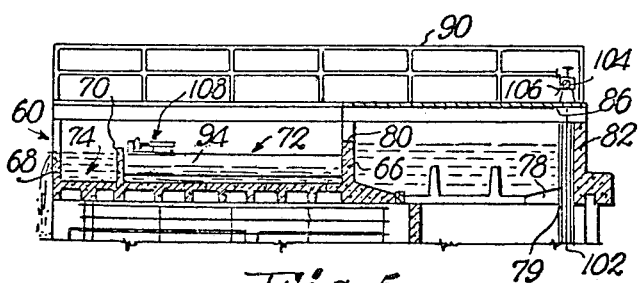
FIG. 5 is a fragmentary, partial sectional view similar to FIG. 3 and showing the operation of the liquid supply means during deicing of the air inlet louvers of the tower.
Figure 6:
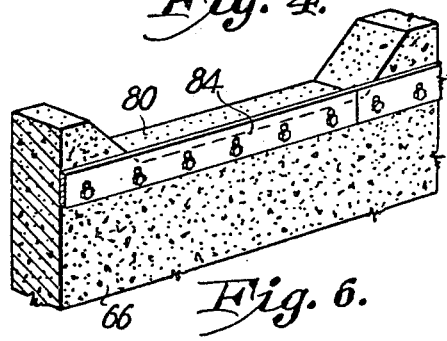
FIG. 6 is an enlarged, fragmentary, perspective view of the common sidewall between the inlet flume and the distribution basin in the embodiment of the invention depicted in FIGS. 1–5.

For example, during cold weather operation the external atmosphere around air inlet louvers 44 and above distributor 60 and flume 78 may be saturated with a fine spray of liquid that is capable of icing over air inlet louvers 44 to restrict the flow of air into the fill assembly. To deice louvers 44 when necessary, it is therefore desirable to fill outer basin 74 so that the hot liquid may overflow outer wall 68 and cascade along the louvers as depicted in FIG. 5. To accomplish this, the bladders 114 or 150 of the corresponding valve means 108 or 144 may be pneumatically inflated to allow full liquid flow through the secondary conduits or flumes. If necessary, substantially the entire inlet liquid flow may pass through these secondary members to fill basin 74 and cascade along louvers 44 to deice the same. By varying the pressure of air supplied to valve bladders, the latter can be inflated to the extent desired to locate the respective valve plates 110 or 146 in positions intermediate its minimum and maximum flow positions, thereby variably restricting flow through the secondary members as desired. To reduce flow through one of the latter, pressure in the associated valve bladder is reduced, and the natural resiliency thereof causes contraction of the bladder and shifting of corresponding plate to a more closed position.

The bladder actuators of the valves hereof may also be exposed to a fine spray of cold liquid which tends to form a film of ice thereon. The resilient nature of the bladders allows them to be readily expanded when pneumatic pressure is applied thereto to break any ice film formed thereon. Upon relieving pneumatic pressure from the interior of the bladders the natural resiliency thereof causes a corresponding shifting of the associated plate to a closed position, again readily breaking any films of ice formed on the bladders. Accordingly, films of ice collected upon the external surface of the valve bladders are broken up each time the bladder expands or contracts, thereby preventing the actuating mechanism from freezing solid.

It will thus be seen that the supply means of the present invention delivers hot liquid to the associated overhead liquid distributors in flow patterns assuring uniform flow through the entire fill assembly for most efficient cooling tower operation, and accomplishes this using a simplified construction free of overhead, horizontal feeder piping. The structural elements making up the supply means (which can include any combination of conduits and flumes as desired) are preferably composed of precast concrete which are sufficiently massive in weight so as to remain in place upon the fill assembly framework without being rigidly fastened thereto.

Having thus described the invention, what is claimed as new and desired to be secured by Letters Patent is:

1. In combination with a crossflow cooling tower provided with a fill assembly having respective air inlet and outlet faces with inner and outer fill portions therebetween for serial passage of air therethrough, hot liquid supply and distribution structure comprising:
    horizontally adjacent, inner and outer hot liquid distribution basins respectively overlying said inner and outer fill portions for receiving and distributing hot liquid to be cooled to respective portions;
    first liquid supply means located inwardly of said inner distribution basin and adjacent thereto;
    means for supplying hot liquid from said first liquid supply means to said adjacent inner distribution basin which includes structure permitting said hot liquid to overflow from said first liquid supply means to said inner distribution basin only after the liquid level within said first liquid supply means reaches a predetermined level; and
    second liquid supply means extending between and intercommunicating said first liquid supply means and outer distribution basin for delivery of hot liquid to the latter,
    said second liquid supply means being in communication with said first liquid supply means at a level therein below said predetermined level.

2. The combination as set forth in claim 1 wherein said first liquid supply means comprises a first open-top flume defined by spaced inner and outer sidewalls.

3. The combination as set forth in claim 2 wherein said second liquid supply means comprises a number of second, spaced, open-top flumes extending outwardly from said first flume for communicating the interior of the latter with said outer distribution basin.

4. The combination as set forth in claim 3 wherein the outer flume-defining sidewall of said first flume extending between said spaced second flumes is of greater height than the height of said second flumes.

5. The combination as set forth in claim 4 wherein a series of vertically adjustable weirs are provided on said outer first flume-defining sidewall extending between said spaced, outwardly extending second flumes for varying the effective height of said sidewall.

6. The combination as set forth in claim 1 wherein said first liquid supply means comprises a first closed-top liquid conduit.

7. The combination as set forth in claim 6 wherein said second liquid supply means comprises a plurality of second, spaced, closed-top conduits extending outwardly from said first conduit for communicating the interior of the latter with said outer basin, there being a number of hot liquid overflow openings in said first conduit respectively situated between at least certain of said second conduits and positioned above the level of communication between said first and second conduits.

8. The combination as set forth in claim 6 wherein said second liquid supply means comprises a plurality of spaced open-top flumes extending outwardly from said first liquid conduit for communicating the interior of the latter with said outer basin, there being a number of hot liquid overflow openings in said first conduit respectively situated between at least certain of said flumes and positioned above the level of communication between said first conduit and spaced flumes.

9. The structure as set forth in claim 1 including means situated within said second liquid supply means for selectively controlling the flow of hot liquid therethrough.

* * * * *